May 9, 1939.  D. F. WARNER  2,157,838
ELASTIC FLUID TURBINE SHAFT AND DISK STRUCTURE AND THE LIKE
Filed April 23, 1937
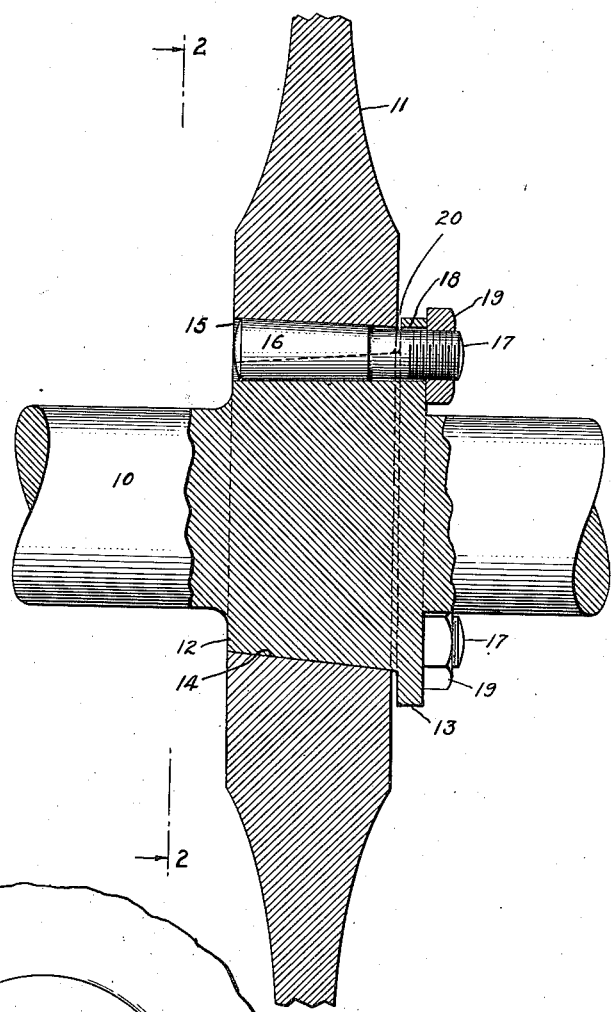
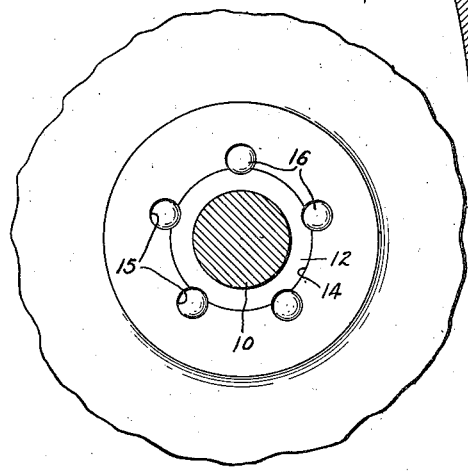
Inventor:
Donald F. Warner,
by Harry E. Dunham
His Attorney.

Patented May 9, 1939

2,157,838

UNITED STATES PATENT OFFICE 2,157,838

ELASTIC FLUID TURBINE SHAFT AND DISK STRUCTURE AND THE LIKE

Donald F. Warner, Lynn, Mass., assignor to General Electric Company, a corporation of New York Application April 23, 1937, Serial No. 138,575

4 Claims. (Cl. 287—52.05)

The present invention relates to elastic fluid turbine shafts and disk structures and the like, that is, to arrangements comprising a rotatable shaft and a disk secured thereto as are used for example in elastic fluid turbines having a bucket wheel rigidly secured to a rotatable shaft. More broadly my invention relates to arrangements comprising two machine elements rigidly secured together with one machine element surrounding and engaging the other.

One object of my invention is to provide an improved construction and arrangement of the type above specified. Another object of my invention is to provide an improved method of manufacturing such structures.

For a consideration of what I believe to be novel and my invention, attention is directed to the following description and the claims appended thereto in connection with the accompanying drawing.

In the drawing, Fig. 1 illustrates a structure embodying my invention, and Fig. 2 is a sectional view along line 2—2 of Fig. 1.

The arrangement shown in the drawing comprises a turbine shaft 10 and a disk 11 forming part of a bucket wheel secured to the shaft. The shaft 10 has a tapered portion 12 and a flange or ring 13 adjacent that end of the tapered portion 12 which has the larger diameter. In the present instance the flange 13 and the tapered portion 12 are integrally formed with the shaft 10. The disk 11 has a bore or opening or recess 14 which is tapered to fit the tapered shaft portion 12. A plurality of tapered bores 15 are formed in adjacent portions of the tapered shaft portion and the disk 11. The bores 15 are tapered in a direction opposite to that of the taper of the shaft portion 12. In the present instance the shaft portion 12 is tapered towards the left and the bores 15 are tapered towards the right. A tapered pin 16 with a screw-threaded end portion 17 is disposed in each bore 15. The screw-threaded end portion 17 projects through an opening 18 in the flange 13. A nut 19 bearing against the right-hand face of the flange 13 engages the screw-threaded portion 17 of the tapered pins 16 and thereby forces the disk 11 into tight engagement with the tapered shaft portion 12.

When assembled, the right-hand face of the disk 11 is slightly spaced from the left-hand face of the flange 13 as indicated at 20. This is important, especially in the case of elastic fluid turbines where the disk is subject to considerable strains and stresses during operation which after a while cause certain deformations, resulting in loosening of the disk on the shaft. With the aforementioned spacing 20 the disk 11 may be retightened on the turbine shaft, that is, drawn or forced into tight engagement with the tapered shaft portion 12 by tightening the nuts 19.

During manufacture the tapered bores 15 for the tapered pins 16 are made after the disk 11 has been assembled with the tapered shaft portion 12. Upon finishing of the bores 15 the disk 11 is removed from the shaft to be heated and thereupon shrunk onto the tapered shaft portion 12 and rigidly assembled therewith by inserting the tapered pins 16 and tightening the nuts 19 thereon.

With my invention I have accomplished an improved construction and method of making and assembling structures comprising a shaft or first machine element and a disk or second machine element. One of the elements has a tapered portion engaging a tapered opening in the other element and rigidly secured to such other element by means of a plurality of circumferentially spaced tapered pins disposed in tapered openings formed in adjacent portions of the two elements. The tapered pins are secured to a ring or like member bearing against or integrally formed with the wider end of the tapered portion of said elements. In a preferred embodiment I provide at least three circumferentially uniformly spaced pins to maintain concentricity between the shaft and the disk in case the latter should become loose during the operation.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. Elastic fluid turbine including the combination of a shaft having a tapered portion, a flange formed at the wider end of the tapered portion, a bucket wheel disk with a tapered recess shrunk onto the tapered portion, at least three circumferentially spaced tapered bores formed in adjacent portions of the tapered shaft portion and the bucket wheel disk, the direction of the taper of the bores being opposite to that of the taper of the recess, and a tapered pin disposed in each bore and having a screw-threaded portion secured to the flange.

2. Elastic fluid turbine including the combination of a shaft having a tapered portion, a ring at the wider end of the tapered portion, a bucket wheel disk with a tapered recess shrunk onto the tapered shaft portion, a plurality of tapered bores being formed in adjacent portions of the shaft and the disk, and a tapered pin disposed in each bore and secured to the ring, the adjacent surfaces of the disk and the ring being initially spaced to permit retightening of the disk on the tapered shaft portion after deformation of the disk during operation.

3. The combination of a first machine element having a tapered portion, a second machine element having a tapered opening surrounding and shrunk onto said tapered portion, and means rigidly securing the two elements together comprising at least three tapered pins disposed in substantially uniformly spaced openings formed in adjacent portions of the two elements, the openings for the pins being tapered in a direction opposite to the taper of the tapered portion of the first element.

4. Shaft and disk structure comprising a shaft having a tapered portion with a flange having a plurality of circumferentially spaced bores at the larger end of the tapered portion with a disk having a tapered opening engaging the tapered shaft portion with adjacent faces of the disk and the flange slightly spaced, a plurality of circumferentially spaced bores formed in adjacent portions of the tapered portion and the disk in alignment with the bores in the flange, the taper of said bores being opposite to that of the tapered shaft portion, a tapered pin in each bore with a screw-threaded end portion projecting through the bore in the flange, and a nut on said screw-threaded end portion to force the disk onto the tapered shaft portion to maintain rigid connection between the shaft and the disk.

DONALD F. WARNER.